United States Patent
Arends et al.

(10) Patent No.: US 12,538,133 B2
(45) Date of Patent: Jan. 27, 2026

(54) SLICE-BASED SECURITY PROTOCOL SELECTION FOR INTERNET PROTOCOL MULTIMEDIA SUBSYSTEM (IMS)

(71) Applicant: T-MOBILE INNOVATIONS LLC, Overland Park, KS (US)

(72) Inventors: Joel Lee Arends, Renton, WA (US); Nassereddine Sabeur, Bellevue, WA (US); Boris Antsev, Bothell, WA (US); Harikishore Allu Balan, Lynnwood, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 102 days.

(21) Appl. No.: 18/403,436

(22) Filed: Jan. 3, 2024

(65) Prior Publication Data
US 2025/0220438 A1    Jul. 3, 2025

(51) Int. Cl.
*H04W 12/71* (2021.01)
*H04W 12/086* (2021.01)
*H04W 12/63* (2021.01)

(52) U.S. Cl.
CPC ......... *H04W 12/71* (2021.01); *H04W 12/086* (2021.01); *H04W 12/63* (2021.01)

(58) Field of Classification Search
CPC .... H04W 12/086; H04W 12/63; H04W 12/71
See application file for complete search history.

(56) References Cited

U.S. PATENT DOCUMENTS

| | | | |
|---|---|---|---|
| 9,635,636 B1* | 4/2017 | Cai | H04W 80/10 |
| 9,882,936 B2 | 1/2018 | Khalil et al. | |
| 2005/0174937 A1* | 8/2005 | Scoggins | H04M 7/006 370/230 |
| 2011/0164736 A1* | 7/2011 | Farthofer | H04M 15/63 379/114.01 |
| 2016/0234197 A1 | 8/2016 | Naslund et al. | |
| 2018/0176876 A1* | 6/2018 | Alam | H04W 60/00 |
| 2020/0106812 A1* | 4/2020 | Verma | H04W 12/088 |
| 2021/0021647 A1* | 1/2021 | Cai | H04L 45/306 |
| 2021/0092673 A1* | 3/2021 | Young | H04W 4/029 |
| 2022/0046478 A1* | 2/2022 | Oyman | H04W 28/22 |

(Continued)

FOREIGN PATENT DOCUMENTS

WO    2014201904 A1    12/2014

*Primary Examiner* — William S Powers

(57) ABSTRACT

Various embodiments comprise a wireless communication network to perform slice-based security protocol selection for Internet Protocol Multimedia Subsystem (IMS). In some examples, the wireless communication network comprises a Call Session Control Function (CSCF). The CSCF receives an IMS registration request transferred by a wireless user device, generates an authorization request that includes an Address Value Pair (AVP) requesting a slice Identifier (ID) for the wireless user device, and transfers the authorization request to a network data system. The CSCF receives an authorization response from the network data system that includes the slice ID for the wireless user device. The CSCF selects a security protocol for authenticating the wireless user device based on the slice ID. The CSCF transfers an authentication challenge for delivery to the wireless user device and establishes a secure communication channel with the wireless user device using the selected security protocol.

20 Claims, 10 Drawing Sheets

(56) References Cited

U.S. PATENT DOCUMENTS

| | | | | |
|---|---|---|---|---|
| 2023/0062145 A1* | 3/2023 | Sabeur | ............... | H04W 60/00 |
| 2023/0269655 A1* | 8/2023 | Parikh | ............... | H04W 12/03 |
| | | | | 455/411 |
| 2023/0379686 A1* | 11/2023 | Balan | ............... | H04W 8/04 |

* cited by examiner

US 12,538,133 B2

SLICE-BASED SECURITY PROTOCOL SELECTION FOR INTERNET PROTOCOL MULTIMEDIA SUBSYSTEM (IMS)

TECHNICAL FIELD

Various embodiments of the present technology relate to Internet Protocol Multimedia Subsystem (IMS), and more specifically, to selecting security protocols for IMS based on user device slice Identifiers (IDs).

BACKGROUND

Wireless communication networks provide wireless data services to wireless user devices. Exemplary wireless data services include machine-control, internet-access, media-streaming, online gaming, and social-networking. Exemplary wireless user devices comprise phones, computers, vehicles, robots, and sensors. Radio Access Networks (RANs) exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). The RANs exchange network signaling and user data with network elements that are often clustered together into wireless network cores over backhaul data links. The core networks execute network functions to provide wireless data services to the wireless user devices.

An Internet Protocol Multimedia Subsystem (IMS) delivers Internet Protocol (IP) multimedia services like voice calling and video conferencing to wireless user devices. The IMS distributes IP addresses to the wireless user devices to facilitate communications between the wireless user devices. The IMS interfaces with wireless network cores to exchange Session Initiation Protocol (SIP) messages with the wireless user devices to communicate with the wireless user devices. The IMS comprises network functions and network elements like Call State Control Function (CSCF), Telephony Application Server (TAS), and Short Message Service Application Server (SMS AS).

The wireless network core transfers network addresses for the IMS to the wireless user device when the wireless user device attaches to the network core over an access node. To be able to use IMS services like voice calling or video conferencing, the user device first registers with the IMS. To register, the user device transfers a registration request to the IMS. The IMS interfaces with subscriber systems in the network core to verify the identity of the user device and confirm that the user device qualifies for IMS service. During the registration sequence, the IMS establishes secure communication links with the wireless user device using a security protocol. Exemplary security protocols include Internet Protocol Security (IPsec) and Secure Real-Time Transport Protocol (SRTP).

Unfortunately, wireless communication networks do not efficiently select security protocols for registering wireless user devices with IMS. Moreover, the IMS does not effectively associate different security protocols with different classes of wireless user device.

Overview

This Overview is provided to introduce a selection of concepts in a simplified form that are further described below in the Technical Description. This summary is not intended to identify key features or essential features of the claimed subject matter, nor is it intended to be used as an aid in determining the scope of the claimed subject matter.

Various embodiments of the present technology relate to solutions for registering user devices with Internet Protocol Multimedia Subsystem (IMS). Some embodiments comprise a method of operating a wireless communication network to perform slice-based security protocol selection for IMS. The method comprises receiving an IMS registration request transferred by a wireless user device, generating an authorization request that includes an Address Value Pair (AVP) requesting a slice Identifier (ID) for the wireless user device, and transferring the authorization request to a network data system. The method further comprises receiving an authorization response from the network data system that includes the slice ID for the wireless user device. The method further comprises selecting a security protocol for authenticating the wireless user device based on the slice ID. The method further comprises transferring an authentication challenge for delivery to the wireless user device and establishing a secure communication channel with the wireless user device using the selected security protocol.

Some embodiments comprise a wireless communication network to perform slice-based security protocol selection for IMS. The wireless communication network comprises a Call Session Control Function (CSCF). The CSCF receives an IMS registration request transferred by a wireless user device, generates an authorization request that includes an AVP requesting a slice ID for the wireless user device, and transfers the authorization request to a network data system. The CSCF receives an authorization response from the network data system that includes the slice ID for the wireless user device. The CSCF selects a security protocol for authenticating the wireless user device based on the slice ID. The CSCF transfers an authentication challenge for delivery to the wireless user device and establishes a secure communication channel with the wireless user device using the selected security protocol.

Some embodiments comprise one or more non-transitory computer readable storage media having program instructions stored thereon to perform slice-based security protocol selection for IMS. When executed by a computing system, the program instructions direct the computing system to perform operations. The operations comprise receiving an IMS registration request transferred by a wireless user device, generating a Multimedia Authorization Request (MAR) that includes an AVP requesting a Single Network Slice Selection Assistance Information (S-NSSAI) for the wireless user device, and transferring the MAR to a network data system. The operations further comprise receiving a Multimedia Authorization Answer (MAA) from the network data system that includes the S-NSSAI for the wireless user device. The operations further comprise selecting one of Internet Protocol Security (IPsec) or Secure Real-Time Transport Protocol (SRTP) for authenticating the wireless user device based on the S-NSSAI. The operations further comprise transferring a Session Initiation Protocol (SIP) 401 message for delivery to the wireless user device that indicates the selected one of IPsec or SRTP and establishing a secure communication channel with the wireless user device using the selected one of IPsec or SRTP.

DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

Figure 1:
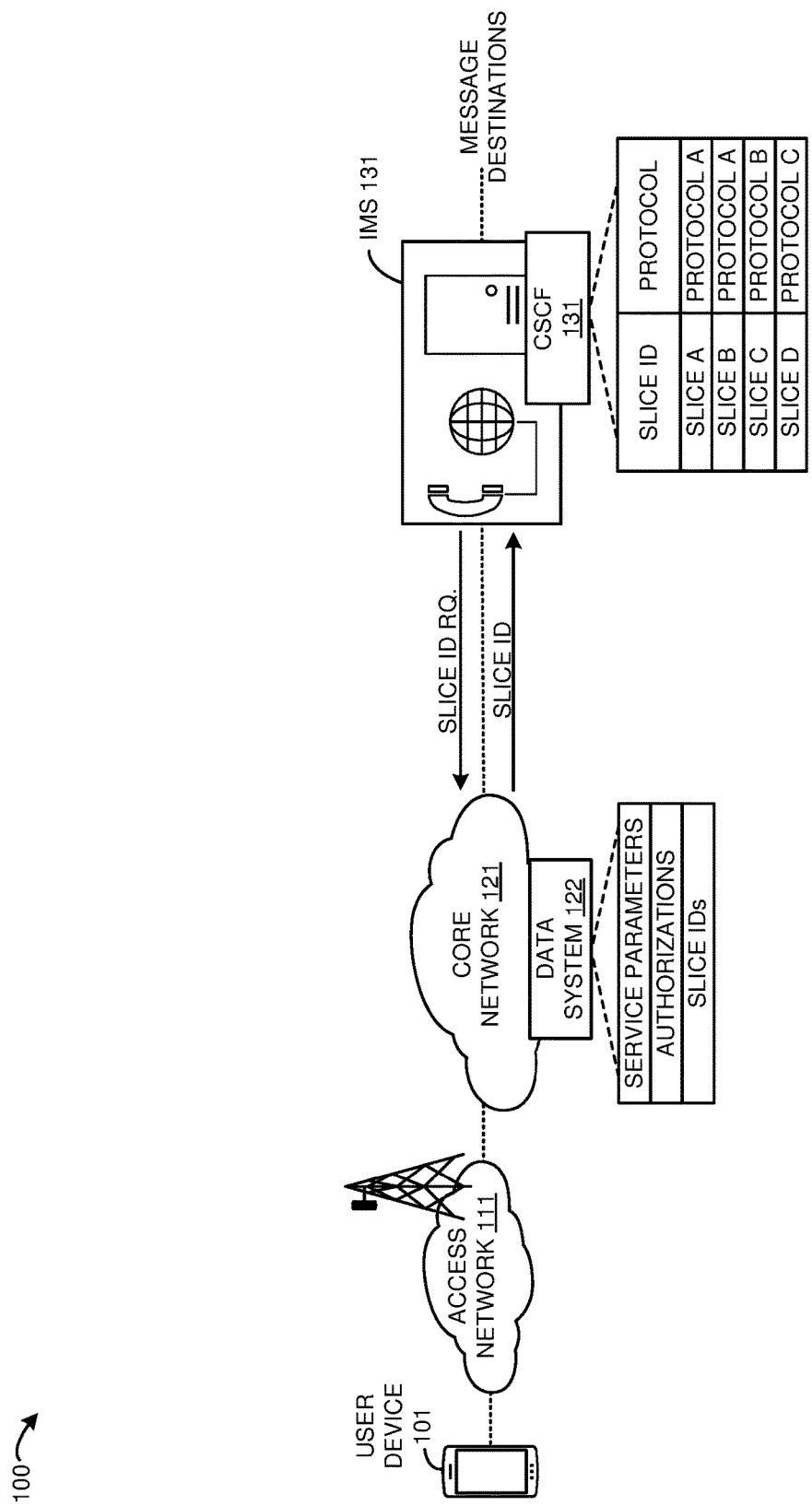
FIG. 1 illustrates a communication network to perform slice-based security protocol selection for Internet Protocol Multimedia System (IMS).

The drawings have not necessarily been drawn to scale. Similarly, some components or operations may not be separated into different blocks or combined into a single block for the purposes of discussion of some of the embodiments of the present technology. Moreover, while the technology is amendable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

FIG. 1 illustrates communication network 100 network to perform slice-based security protocol selection on Internet Protocol Multimedia Subsystem (IMS). Communication network 100 delivers services like machine communications, internet-access, media-streaming, or some other wireless communications product to user devices. Communication network 100 comprises user device 101, access network 111, core network 121, and Internet Protocol Multimedia Subsystem (IMS) 131. Core network 121 comprises data system 122. IMS 131 comprises Call Session Control Function (CSCF) 132. In other examples, wireless network communication network 100 may comprise additional or different elements than those illustrated in FIG. 1.

Various examples of network operation and configuration are described herein. In some examples, CSCF 132 receives a registration request transferred by user device 101 over access network 111 and core network 121. User device 101 registers with IMS 131 to receive multimedia services like voice calling, video calling, text messaging, and the like. CSCF 132 generates an authorization request that includes an Address Value Pair (AVP) to request a slice Identifier (ID) for wireless user device 101. CSCF 132 transfers the authorization request to data system 122. Data system 122 accesses a subscriber profile for user device 101 and returns the slice ID for user device 101 to CSCF 132 based on the AVP included in the authorization request. CSCF 132 hosts a table that correlates security protocols to slice IDs. IMS 131 uses security protocols to establish secure communication channels with user device 101 to complete the registration process. Exemplary security protocols include Internet Protocol Security (IPsec) and Secure Realtime Transport Protocol (SRTP). CSCF 132 selects a security protocol for authenticating user device 101 based on the slice ID. CSCF 132 transfers an authentication challenge to user device 101 over core network 121 and access network 111 to validate the identity of device 101. The authentication challenge indicates the selected security protocol. CSCF 131 and user device 101 interface over core network 121 and access network 111 to establish a secure communication channel using the selected security protocol.

Examples of user device 101 may include a phone, computer, vehicle, robot, and sensor. Access network 111 exchanges wireless signals with user device 101 over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). Access network 111 is connected to core network 121 over backhaul data links. Access network 111 exchanges network signaling and user data with network elements in core network 121. Access network 111 may comprise wireless access points, Radio Access Networks (RANs), internet backbone providers, edge computing systems, or other types of wireless/wireline access systems to provide wireless/wireline links to user device 101, the backhaul data links, and edge computing services between user device 101 and core network 121.

Access network 111 may comprise Radio Units (RUs), Distributed Units (DUs) and Centralized Units (CUs). The RUs may be mounted at elevation and have antennas, modulators, signal processors, and the like. The RUs are connected to the DUs which are usually nearby network computers. The DUs handle lower wireless network layers like the Physical Layer (PHY), Media Access Control (MAC), and Radio Link Control (RLC). The DUs are connected to the CUs which are larger computer centers that are closer to core network 121. The CUS handle higher wireless network layers like the Radio Resource Control (RRC), Service Data Adaption Protocol (SDAP), and Packet Data Convergence Protocol (PDCP). The CUs are coupled to network functions in core network 121.

Core network 121 and IMS 131 are representative of computing systems that provide wireless data services to user device 101 over access network 111. Exemplary computing systems comprise data centers, cloud computing networks, hybrid-cloud networks, Network Function Virtualization Infrastructure (NFVI), and the like. The computing systems of core network 121 store and execute the network functions to provide wireless data services to user device 101 over access network 111. Exemplary network functions include Access and Mobility Management Function (AMF), Session Management Function (SMF), User Plane Function (UPF), and Unified Data Management (UDM). Data system 122 stores subscriber profiles for user devices, including device 101. The subscriber profiles comprise information like user IDs, subscription data, server attributes, Quality-of-Server (QoS) metrics, slice IDs, and the like. Core network 121 may comprise a Fifth Generation Core (5GC) architecture and/or an Evolved Packet Core (EPC) architecture.

The computing systems of IMS 131 store and execute multimedia functions to provide services like voice calling, video conferencing, and text messaging to user device 101. For example, IMS 131 may receive text messages or voice call requests sent by user device 101 and route the text messages and voice call requests to their respective message destinations. In response to a registration request received from user device 101, CSCF 131 interfaces with data system 122 in core network 121 to register user device 101 for multimedia services. CSCF 131 associates security protocols (e.g., SRTP) with slice IDs received from core network 121. As illustrated in FIG. 1, slice ID A is associated with protocol A, slice ID B is associated with protocol A, slice ID C is associated with protocol B, and slice ID D is associated with protocol C. By associating slice IDs with different security protocols, network 100 may tailor security protocols for different groups of subscribers. For example, users that are subscribed for enhanced network slices may be associated with enhanced security protocols while users that are subscribed for standard network slices may be associated with default security protocols. IMS 121 may store and execute other IMS functions like Telephony Application Server (TAS) and Short Message Service Application Server (SMS AS).

Figure 2:
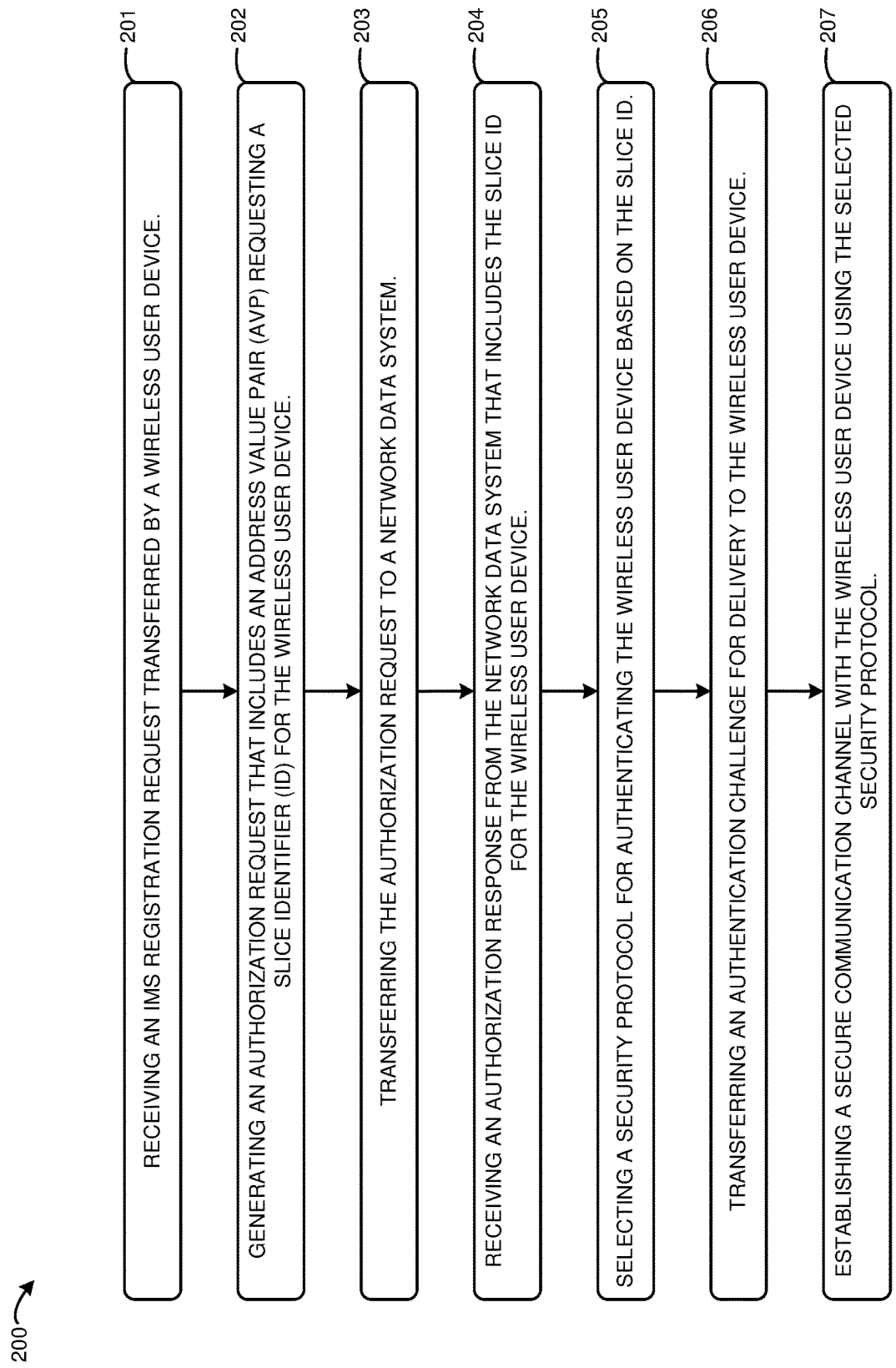
FIG. 2 illustrates an exemplary operation of the communication network to perform slice-based security protocol selection for IMS.

FIG. 2 illustrates process 200. Process 200 comprises an exemplary operation of communication network 100 to perform slice-based security protocol selection for IMS. The operation may vary in other examples. The operations of process 200 comprise receiving an IMS registration request transferred by a wireless user device (step 201). The operations further comprise generating an authorization request that includes an AVP requesting a slice identifier (ID) for the wireless user device (step 202). The operations further comprise transferring the authorization request to a network data system (step 203). The operations further comprise receiving an authorization response from the network data system that includes the slice ID for the wireless user device (step 204). The operations further comprise selecting a security protocol for authenticating the wireless user device based on the slice ID (step 205). The operations further comprise transferring an authentication challenge for delivery to the wireless user device (step 206). The operations further comprise establishing a secure communication channel with the wireless user device using the selected security protocol (step 207).

Figure 3:
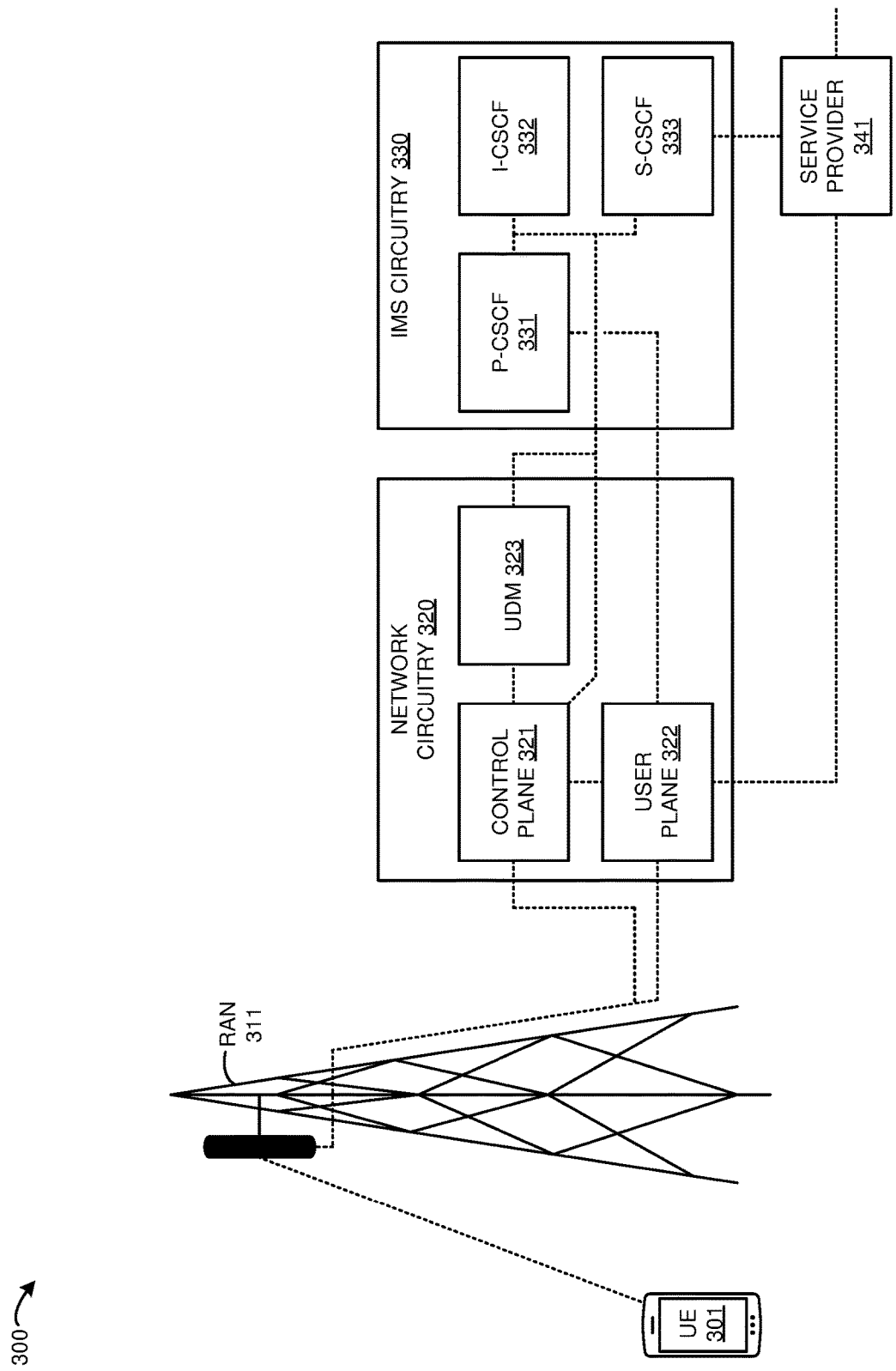
FIG. 3 illustrates a wireless communication network to perform slice-based security protocol selection for IMS.

FIG. 3 illustrates wireless communication network 300 to perform slice-based security protocol selection for IMS. Wireless communication network 300 is an example of network 100, however network 100 may differ. Wireless communication network 300 comprises User Equipment (UE) 301, Radio Access Network (RAN) 311, network circuitry 320, IMS circuitry 330, and service provider 341. Network circuitry 320 comprises control plane 321, user plane 322, and UDM 323. IMS circuitry 330 comprises Proxy Call State Control Function (P-CSCF) 331, Interrogating Call State Control Function (I-CSCF) 332, and Serving Call Session Control Function (S-CSCF) 333. In other examples, wireless network 300 may comprise additional or different elements than those illustrated in FIG. 3.

In some examples, UE 301 attaches to RAN 311 and wirelessly transfers a registration request to control plane 321. Control plane 321 interfaces with UDM 323 to authenticate and authorize UE 301 for wireless data services. Once registered, control plane 321 selects a network slice for UE 301 and directs user plane 322 to serve UE 301 over RAN 311. In response to successfully registering with network circuitry 320, UE 301 transfers an IMS registration request to P-CSCF 331 over RAN 311 and control plane 321. P-CSCF 331 notifies I-CSCF 332 and forwards the registration request to I-CSCF 332. I-CSCF 332 selects S-CSCF 333 to register UE 301 and forwards the request to S-CSCF 333. S-CSCF 333 generates an authorization request for UE 301 to determine if UE 301 is authorized for IMS services. The authorization request includes an AVP that requests the slice ID for UE 301. S-CSCF 333 transfers the authorization request to UDM 323. UDM 323 accesses the subscriber profile for UE 323 and returns authentication data and slice ID for UE 301 to S-CSCF 333. S-CSCF 333 generates an authentication challenge to verify the identity of UE 301 using the received authentication data. The authentication challenge typically comprises a random number challenge that UE 301 must complete to verify its identity. S-CSCF 333 transfers the authentication challenge and slice ID to P-CSCF 331. P-CSCF 331 selects a security protocol for the authentication procedure based on the slice ID. For example, P-CSCF 331 may host a table that correlates slice IDs to SRTP eligibility. P-CSCF 331 includes an indication of the selected security protocol in the message header of the authentication challenge. For example, P-CSCF 331 may insert an SRTP indicator, IPsec indicator, or some other security protocol indicator into the message header. P-CSCF 331 transfers the authentication challenge to UE 301 over user plane 322 and RAN 311. P-CSCF 331 and UE 301 use the selected security protocol to establish a secure communication channel that traverses RAN 311 and user plane 322. For example, P-CSCF 331 and UE 301 may establish an IPsec tunnel, SRTP tunnel, or other type of security protocol communication tunnel that traverses user plane 322 and RAN 311. UE 301 and CSCFs 331-333 may then complete the authentication procedure using the secure communication channel.

Advantageously, wireless communication network 300 efficiently selects security protocols for registering wireless user devices with IMS circuitry 330. Moreover, IMS circuitry 330 effectively associates different security protocols with different classes of wireless UE based on the slice IDs for the wireless UEs.

UE 301 and RAN 311 communicate over links using wireless/wired technologies like 5GNR, LTE, LP-WAN, WIFI, Bluetooth, and/or some other type of wireless or wireline networking protocol. The wireless technologies use electromagnetic frequencies in the low-band, mid-band, high-band, or some other portion of the electromagnetic spectrum. The wired connections comprise metallic links, glass fibers, and/or some other type of wired interface. RAN 311, network circuitry 320, IMS circuitry 330, and service provider 341 communicate over various links that use metallic links, glass fibers, radio channels, or some other communication media. The links use Fifth Generation Core (5GC), IEEE 802.3 (ENET), Time Division Multiplex (TDM), Data Over Cable System Interface Specification (DOCSIS), Internet Protocol (IP), General Packet Radio Service Transfer Protocol (GTP), 5GNR, LTE, WIFI, virtual switching, inter-processor communication, bus interfaces, and/or some other data communication protocols.

UE 301 may comprise a phone, vehicle, computer, sensor, drone, robot, or another type of data appliance with wireless and/or wireline communication circuitry. Although RAN 311 is illustrated as a tower, RAN 311 may comprise another type of mounting structure (e.g., a building), or no mounting structure at all. RAN 311 comprises a Fifth Generation (5G) RAN, LTE RAN, gNodeB, eNodeB, NB-IoT access node, LP-WAN base station, wireless relay, WIFI hotspot, Bluetooth access node, and/or another wireless or wireline network transceiver. UE 301 and RAN 311 comprise antennas, amplifiers, filters, modulation, analog/digital interfaces, microprocessors, software, memories, transceivers, bus circuitry, and the like. Control plane 321 comprises network functions like AMF, SMF, and the like. User plane 322 comprises network functions like UPF, edge UPF, and the like. Although network circuitry 320 is illustrated comprising UDM 323, in some examples UDM 323 may be replaced by or used in addition with a Home Subscriber Server (HSS). Service provider 341 is representative of a data endpoint that provides a multimedia service for UE 301 like an Application Server (AS). In some examples, service provider 341 may comprise a proxy system to facilitate communications between UE 301 and another UE. For example, service provider 341 may comprise another IMS circuitry in another wireless communication network.

UE 301, RAN 311, network circuitry 320, IMS circuitry 330, and service provider 341 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), Field Programmable Gate Array (FPGA), and/or the like. The memories comprise Random Access Memory (RAM), flash circuitry, Solid State Drives (SSD), Non-Volatile Memory Express (NVMe) SSDs, Hard Disk Drives (HDDs), and/or the like. The memories store software like operating systems, user applications, radio applications, network functions, and multimedia functions. The microprocessors retrieve the software from the memories and execute the software to drive the operation of wireless communication network 300 as described herein.

Figure 4:
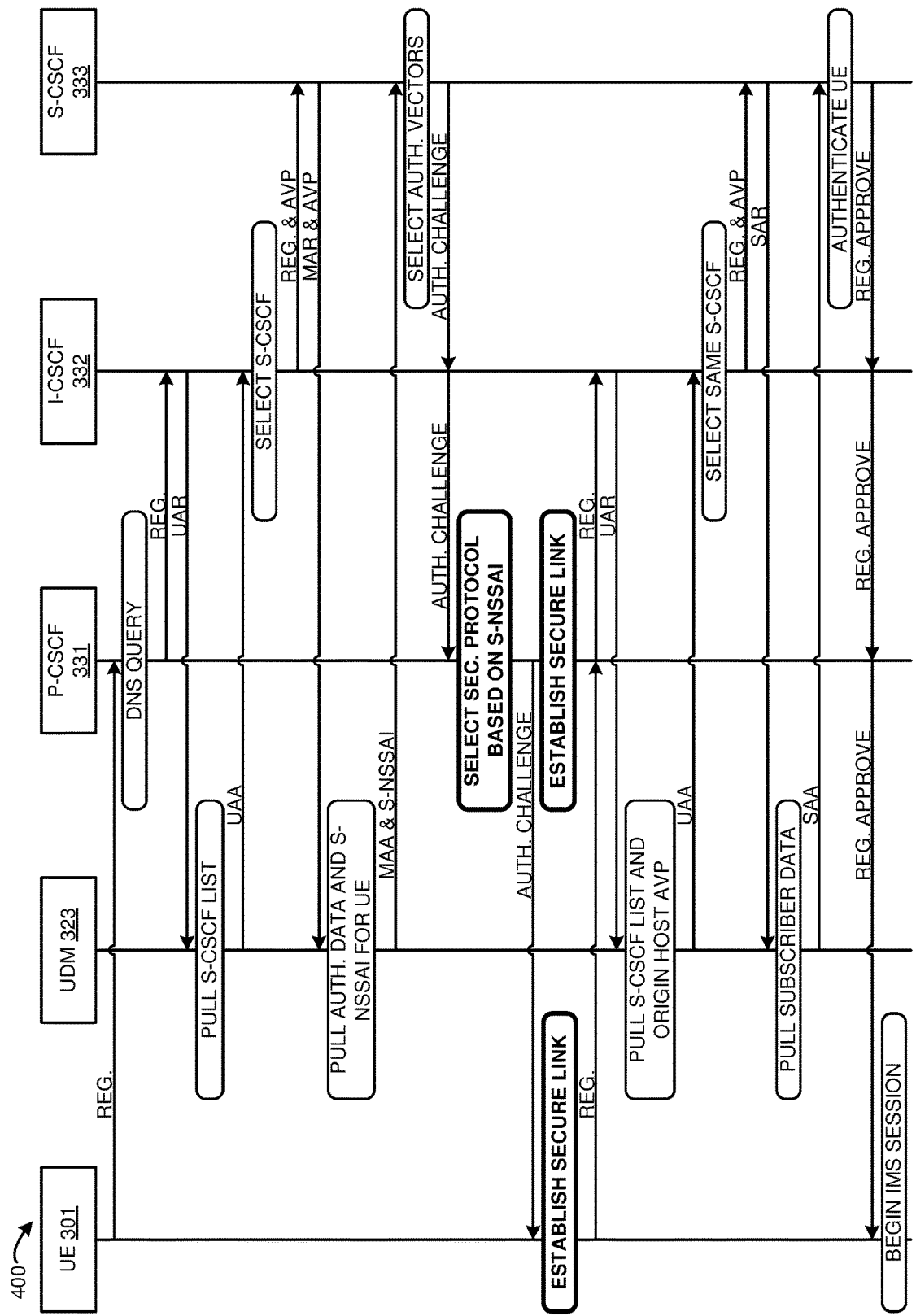
FIG. 4 illustrates an exemplary operation of the wireless communication network to perform slice-based security protocol selection for IMS.

FIG. 4 illustrates process 400. Process 400 comprises an exemplary operation of wireless communication network 300 to perform slice-based security protocol selection for IMS. The operation may vary in other examples. In some examples, UE 301 transfers an IMS registration request (REG.) addressed for P-CSCF 331 to control plane 321 in response to successfully registering with control plane 321. Control plane 321 forwards the registration request to P-CSCF 331. Upon receiving the request, P-CSCF 331 performs a DNS query to retrieve the network address for I-CSCF 332. P-CSCF 331 transfers the registration request to I-CSCF 332 based on the DNS query. I-CSCF generates and transfers a User Authorization Request (UAR) based on the registration request to assign an S-CSCF to UDM 323. UDM 323 determines a set of available S-CSCFs. UDM 323 transfers a User Authorization Answer (UAA) indicating the set of available S-CSCFs. I-CSCF 332 selects S-CSCF 333 based on the S-CSCF list and S-CSCF capabilities indicated by the UAA. I-CSCF 332 forwards the registration request to S-CSCF 333.

S-CSCF 333 receives the registration request from I-CSCF 332. S-CSCF 333 generates a Multimedia Authorization Request (MAR) that includes an AVP that requests the Single-Network Slice Selection Assistance Information (S-NSSAI) for UE 301. S-NSSAIs comprise identifies for network slices. The subscriber profile for a UE stores one or more S-NSSAIs that correspond to the one or more network slices assigned to that UE. For example, when a UE is assigned to a low-latency communication slice, network 300 stores the S-NSSAI for that slice in the subscriber profile of the UE.

S-CSCF 333 transfers the MAR that includes the AVP to UDM 323. UDM 323 receives the MAR and retrieves authentication data for UE 301 to verify the identity of UE 301 reported in the registration request. For example, UDM 323 may access a Unified Data Registry (UDR) in network circuitry 330 to retrieve the authentication data. UDM 323 also retrieves the S-NSSAI for UE 301 from the subscriber profile based on the AVP included in the MAR. UDM 323 transfers a Multimedia Authentication Answer (MAA) comprising the authentication data and S-NSSAI to S-CSCF 333. S-CSCF 333 selects authentication data based on the MAA to generate an authentication challenge. Typically, the authentication challenge involves hashing a random number using a secret identify code associated with UE 301 and comparing the result to an authentication response generated by UE 301. The identity of UE 301 is confirmed when the challenge and the response match. S-CSCF 333 transfers the authentication (AUTH.) challenge and S-NSSAI to I-CSCF 332. I-CSCF 332 forwards the challenge and S-NSSAI to P-CSCF 331.

P-CSCF 331 hosts a table that correlates different security protocols to S-NSSAI. For example, the table may correlate a first set of S-NSSAIs with IPsec, a second set of S-NSSAI with SRTP, and a third set of S-NSSAIs with another security protocol. P-CSCF 331 compares the S-NSSAI retrieved from UDM 323 for UE 301 with the table and selects the security protocol that corresponds to the S-NSSAI for authenticating UE 301. P-CSCF 331 modifies the authentication challenge to indicate the selected security protocol. P-CSCF 331 forwards the modified security challenge to UE 301 via network circuitry 320 and RAN 311.

UE 301 receives the authentication challenge and reads the indicated security protocol. P-CSCF 331 and UE 301 establish secure communication channels for all client side and server-side ports using the selected security protocol. For example, P-CSCF 331 and UE 301 may establish IPsec security associations for UE initiated request, responses to UE, P-CSCF initiated requests, and responses to P-CSCF. Once the secure channels are set, UE 301 generates an authentication response to verify its identity. UE 301 transfers a second registration request addressed for P-CSCF 331 over the secure communication channels that traverse user plane 322 and RAN 311. The second registration request includes the authentication response generated by UE 301. P-CSCF 331 receives the second registration request and forwards the second request to I-CSCF 332. I-CSCF 332 generates and transfers a second UAR to UDM 323. UDM 323 replies with a UAA that indicates the available S-CSCFs. I-CSCF 332 selects S-CSCF 333 and forwards the second request to S-CSCF 333. In some examples, I-CSCF 332 may select a different S-CSCF to complete the registration process.

S-CSCF 333 receives the second registration request and selects UDM 323. S-CSCF 333 generates and transfers a Server Assignment Request (SAR) to UDM 323 to retrieve subscriber information for UE 301. UDM 323 receives the SAR and returns a Server Assignment Answer (SAA) that comprises the subscriber data. S-CSCF 333 compares the authentication response generated by UE 301 that was included in the second registration request to the subscriber data to verify the identity of UE 301. In response to the authentication, S-CSCF 333 registers UE 301 for IMS services over IMS circuitry 330. S-CSCF 333 transfers a registration approval message to I-CSCF 332 for delivery to UE 301. I-CSCF 332 forwards the approval to P-CSCF 331. P-CSCF 331 forwards the approval to UE 301 over the secure communication channels that traverse user plane 322 and RAN 311. UE 301 receives the registration confirmation and responsively initiates an IMS session. For example, UE 301 may transfer a Session Initiation Protocol (SIP) invite to P-CSCF 331 to initiate a voice call with another UE over server provider 341.

Figure 5:
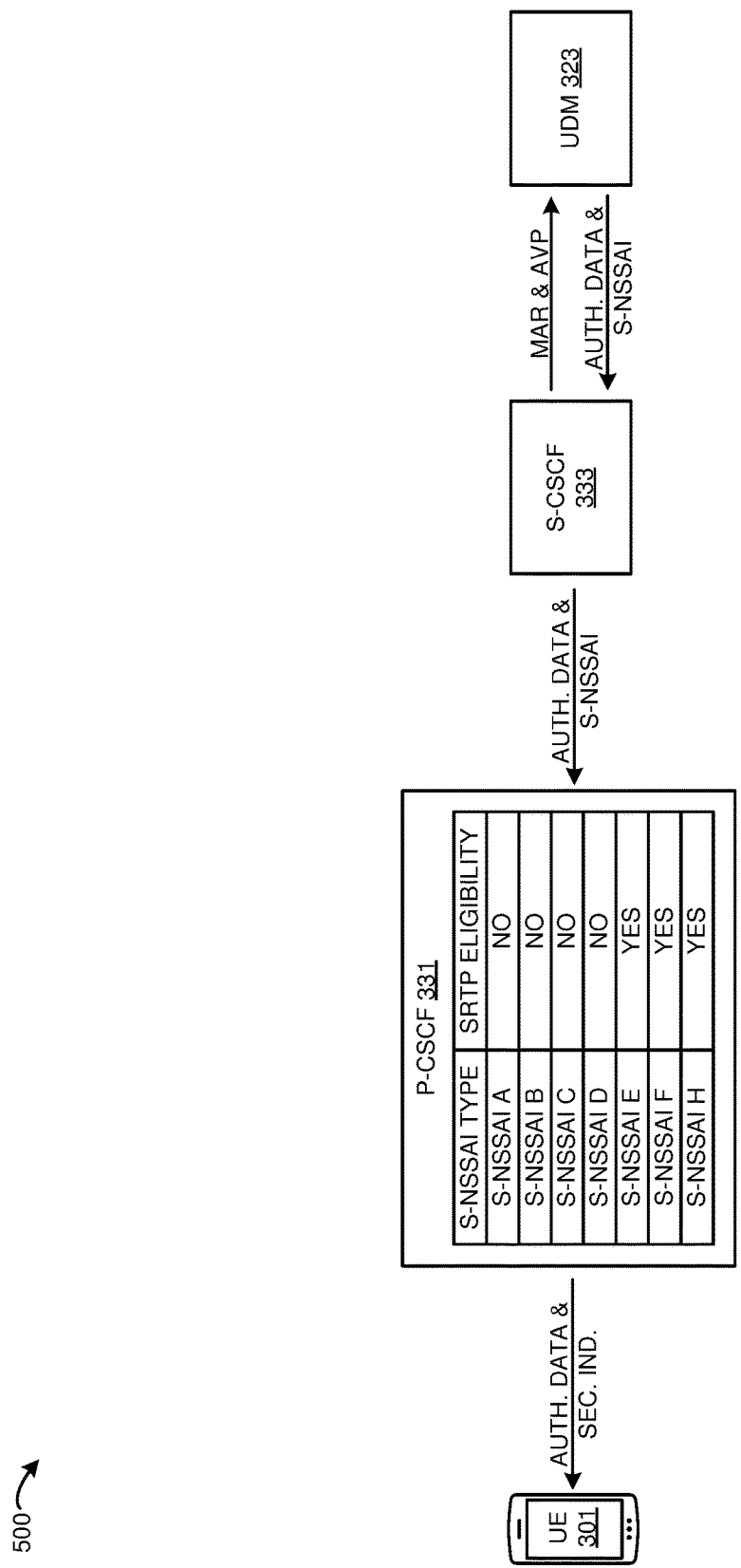
FIG. 5 further illustrates the wireless communication network to perform slice-based security protocol selection for IMS.

FIG. 5 further illustrates wireless communication network 500 to perform slice-based security protocol selection for IMS. In some examples, S-CSCF 333 transfers an MAR that includes an AVP that requests S-NSSAI to UDM 323. UDM 323 returns authentication data (AUTH. DATA) to authenticate UE 301 and the S-NSSAI of the slice assigned to UE 301. S-CSCF 333 provides the authentication data and S-NSSAI to P-CSCF 331. P-CSCF 331 hosts a data structure that implements the table illustrated in FIG. 5. As illustrated in FIG. 5, the table correlates different S-NSSAIs to SRTP eligibility. In this example, the table indicates S-NSSAIs A-D do not qualify for SRTP while S-NSSAIs E-H are eligible for SRTP. P-CSCF 331 compares S-NSSAIs retrieved from UDM 323 to the table to determine the security protocol to use when registering UE 301 for IMS service. When the S-NSSAI qualifies for SRTP, P-CSCF 331 selects SRTP to establish the secure communication channels to complete the registration process. When the S-NSSAI does not qualify for SRTP, P-CSCF 331 typically selects IPsec to establish the secure communication channels to complete the registration process. For example, some S-NSSAIs may be associated with Mobile Virtual Network Operators (MVNOs) that are not authorized for SRTP. For example, some S-NSSAIs may be associated with geographic locations where the end-to-end encryption provided by SRTP is prohibited. P-CSCF 331 compares the S-NSSAI for UE 301 to the table and determines and responsively selects a security protocol for UE 301 based on the comparison. P-CSCF 331 transfers the authentication data and a security indication (SEC. IND.) that identifies the selected security protocol for delivery to UE 301.

Figure 6:
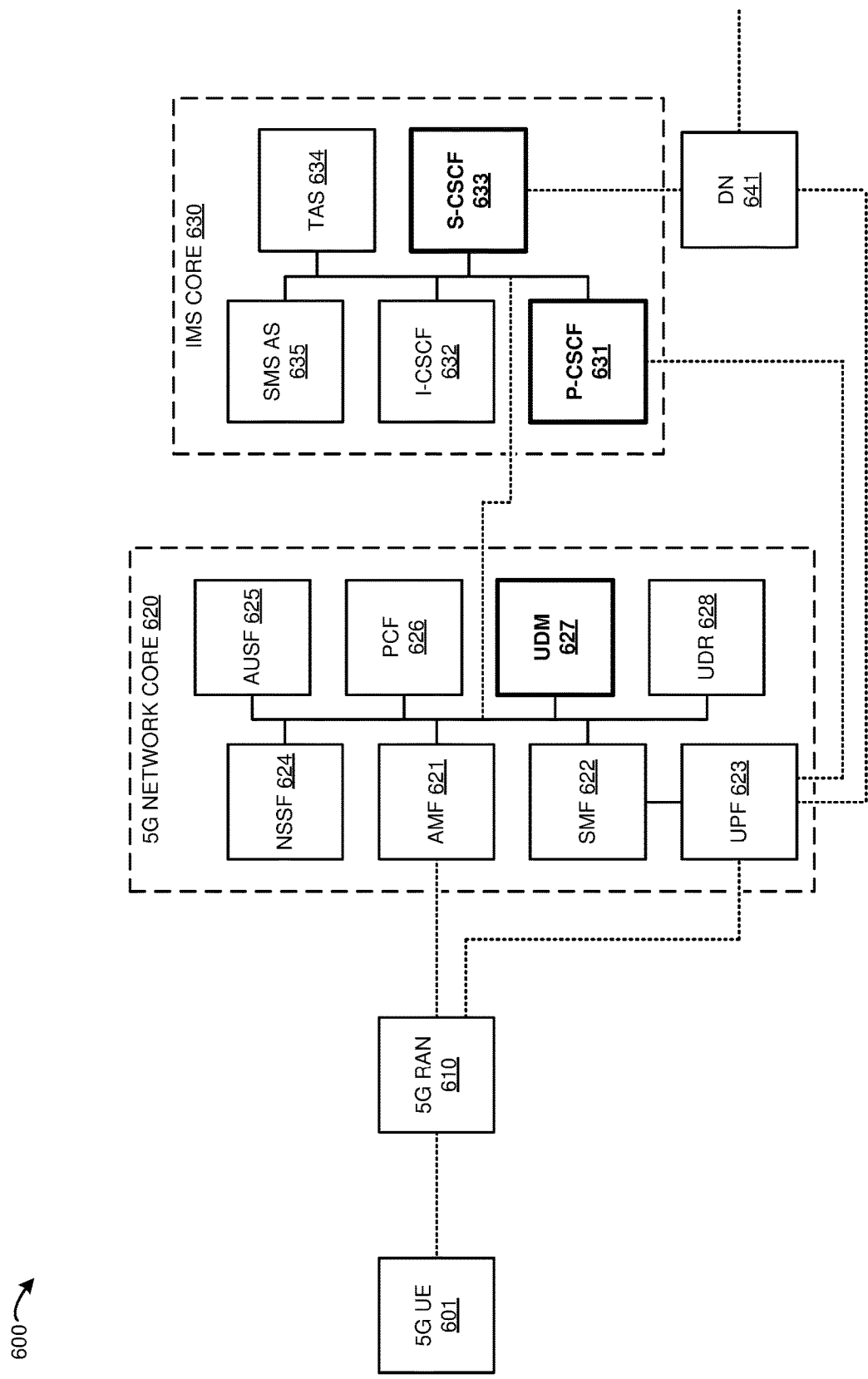
FIG. 6 illustrates a Fifth Generation (5G) wireless communication network to perform slice-based security protocol selection for IMS.

FIG. 6 illustrates 5G communication network 600 to perform slice-based security protocol selection for IMS. 5G communication network 600 comprises an example of networks 100 and 300, although networks 100 and 300 may differ. 5G communication network 600 comprises 5G UE 601, 5G RAN 610, 5G network core 620, IMS core 630, and data network (DN) 641. 5G network core 620 comprises AMF 621, SMF 622, UPF 623, Network Slice Selection Function (NSSF) 624, Authentication Server Function (AUSF) 625, Policy Control Function (PCF) 626, UDM 627, and UDR 628. IMS core 630 comprises P-CSCF 631, I-CSCF 632, S-CSCF 633, TAS 634, and SMS AS 635. Other network functions and network elements like Network Repository Function (NRF), Network Exposure Function (NEF), and HSS are typically present in 5G network core 620 but are omitted for clarity. In other examples, wireless network communication network 600 may comprise additional or different elements than those illustrated in FIG. 6.

In some examples, UE 601 wirelessly attaches to RAN 610. UE 601 exchanges attachment signaling with RAN 610 to establish a connection with 5G network applications hosted in RAN 610. The attachment signaling indicates information like a registration type, UE capabilities, requested slice types, Protocol Data Unit (PDU) session requests, and the like. RAN 610 transfers a registration request for UE 601 to AMF 621. The registration request comprises the information transferred by UE 601 in the attachment signaling. AMF 621 transfers an identity request to UE 601 via RAN 610. UE 601 responsively indicates its identity to AMF 621 via RAN 610. AMF 621 interacts with AUSF 625, PCF 626, and UDM 627 to authenticate and authorize UE 601 for wireless data service.

Responsive to the authentication and authorization, AMF 621 transfers a context request for UE 301 to UDM 627. UDM 627 accesses the subscriber profile for UE 601 stored on UDR 628 and retrieves Quality-of-Service (QOS) metrics, allowed S-NSSAI, service attributes, IMS permissions, and the like from UDM 627. AMF 621 indicates the allowed S-NSSAI to NSSF 624 to select a network slice for UE 601. NSSF 624 responds with an N-SSAI for UE 601 based on the allowed S-NSSAI and other service attributes (e.g., requested slice type). AMF 621 selects SMF 622 to serve UE 601 based on the S-NSSAI, QOS metrics, service attributes, and/or other data retrieved from UDM 627. SMF 622 selects P-CSCF 631 and UPF 623 based on the service information provided by UDM 627. SMF 622 indicates the network addresses for UPF 623 and P-CSCF 631 to AMF 621. AMF 621 generates UE context for UE 601 using the received information. The UE context comprises the QoS metrics, the S-NSSAI, the network addresses, the service attributes, and the like. AMF 621 transfers the UE context to UE 601 over RAN 610.

UE 601 initiates an IMS registration request to register with IMS core 630. UE 601 generates a registration request and uses the network address P-CSCF 631 in the UE context to transfer the registration message to RAN 610. RAN 610 transfers the IMS registration request to UPF 623. UPF 623 identifies the network address in the IMS registration request and forwards the request to P-CSCF 631. P-CSCF 631 receives the registration request from UPF 623. P-CSCF 631 retrieves a network address for I-CSCF 632 (e.g., by DNS query) and forwards the registration request to I-CSCF 632 using the retrieved network address. I-CSCF 632 generates a UAR to identify available S-CSCFs and transfers the UAR for delivery to UDM 627. UDM 627 determines a set of available S-CSCFs, including S-CSCF 633, and transfers a UAA indicating the S-CSCFs. I-CSCF 632 receives the UAA and selects S-CSCF 633 to register UE 301 for IMS services. I-CSCF 632 forwards the registration request to S-CSCF 633.

S-CSCF 633 receives the registration request and generates a MAR to retrieve user authentication data associated with UE 601. The MAR includes an AVP to request the S-NSSAI(s) for UE 601. The requested S-NSSAI may comprise the allowed S-NSSAI(s) for UE 601 or the active S-NSSAI(s) (e.g., the network slice(s) UE 601 is attached to). S-CSCF 633 transfers the MAR for delivery to UDM 627. UDM 627 receives the MAR and accesses a subscriber profile for UE 601 to retrieve authentication data and the S-NSSAI. The authentication data typically includes a random number, an authentication token, a signed result, a cipher key, and an integrity key. UDM 627 transfers an MAA that includes the authentication data and S-NSSAI to S-CSCF 633.

S-CSCF 633 selects authentication vectors to verify the identity of UE 601 based on the authentication data. S-CSCF 633 generates a Session Initiation Protocol (SIP) 401 message that comprises the authentication data. S-CSCF 633 transfers the SIP 401 message and S-NSSAI for UE 601 to I-CSCF 632 which in turn forwards the SIP 401 message and S-NSSAI to P-CSCF 631. P-CSCF 631 removes and caches a portion of the authentication data from the SIP 401 message. The remaining authentication data in the SIP 401 message comprises a random number and authentication token that UE 601 can use to generate an authentication response to verify its identity. P-CSCF 631 compares the S-NSSAI retrieved from UDM 627 to a table that correlates SRTP eligibility to S-NSSAI. When the S-NSSAI for UE 601 is eligible for SRTP, P-CSCF 631 selects SRTP to create secure communication channels to complete the registration process. When the S-NSSAI for UE 601 is ineligible for SRTP, P-CSCF 631 selects IPsec to create secure communication channels to complete the registration process. In this example, P-CSCF 631 determines the S-NSSAI is eligible for SRTP and selects SRTP to complete the authentication process. P-CSCF 631 inserts an SRTP indication into the message header of the SIP 401 message and transfers the SIP 401 message to UPF 623 for delivery to UE 601. UPF 623 transfers the SIP 401 message to UE 601 over RAN 610. UE 601 reads the message header of the SIP 401 message and identifies the selected security protocol as SRTP. UE 601 and P-CSCF 631 establish SRTP security associations for client and server ports. Once the SRTP tunnels are established, UE 601 uses the random number received in the SIP 401 message to generate an authentication response. For example, UE 601 may hash the random number using its secret identity code to generate the authentication response.

UE 601 generates a second IMS registration request to complete the registration with IMS core 630. UE 601 addresses the second request for P-CSCF 631 and transfers the second request to P-CSCF 631 over RAN 610 and UPF 623 over the SRTP tunnels. P-CSCF 631 forwards the request to I-CSCF 632. I-CSCF 632 generates a second UAR and transfers the UAR to UDM 627. UDM 627 receives the UAR and determines a set of S-CSCFs and transfers a UAA indicating the S-CSCFs to I-CSCF 632. I-selects S-CSCF 633 based on the UAA and forwards the second registration request to S-CSCF 633. S-CSCF 633 receives the second registration request and generates a SAR to retrieve subscriber data associated with UE 601 to verify the authentication response generated by UE 601. S-CSCF 633 transfers the SAR for delivery to UDM 627. UDM 627 receives the SAR and accesses a subscriber profile for UE 601 to retrieve the subscriber data. UDM 627 UDM transfers an SAA that includes the subscriber data to S-CSCF 633. S-CSCF 633 matches an expected result for the authentication challenge to the authentication response from UE 601 to authenticate the identity of UE 601. S-CSCF 633 registers UE 601 for IMS service based on the authentication. S-CSCF 633 generates a SIP 200 message to acknowledge the registration. S-CSCF 633 transfers the SIP 200 message to I-CSCF 632 which in turn forwards the SIP 200 message to P-CSCF 631. P-CSCF 631 transfers the SIP 200 message to UPF 623 for delivery to UE 601. UPF 623 transfers the SIP 200 message to UE 601 over RAN 610.

Once registered, UE 601 initiates a Mobile Originated (MO) IMS voice session (or some other type of IMS media session) with IMS core 630. UE 601 generates a SIP invite message and addresses the message for delivery to P-CSCF 631. UE 601 transfers the SIP invite to RAN 610. RAN 610 transfers the SIP invite to UPF 623. UPF 623 forwards the SIP invite message to P-CSCF 631 based on the address. P-CSCF 631 interfaces with I-CSCF 632 and S-CSCF 633 to deliver the SIP invite to a message destination. S-CSCF 632 processes the SIP invite to select a message destination to setup the MO IMS session. S-CSCF 632 transfers the SIP invite to an application server in data network 641. The data network accepts the SIP invite and S-CSCF 633 indicates the acceptance to UE 601 over 5G core network 620. UE 601 exchanges user data for the MO IMS voice session with UPF 623 over RAN 610. UPF 623 exchanges the user data for the MO IMS voice session with the application server in data network 641. S-CSCF 633 interfaces with one or more of P-CSCF 631, I-CSCF 632, TAS 634, and SMS AS 635 to monitor the MO IMS voice session and control the data flow between UE 601 and data network 641.

Figure 7:
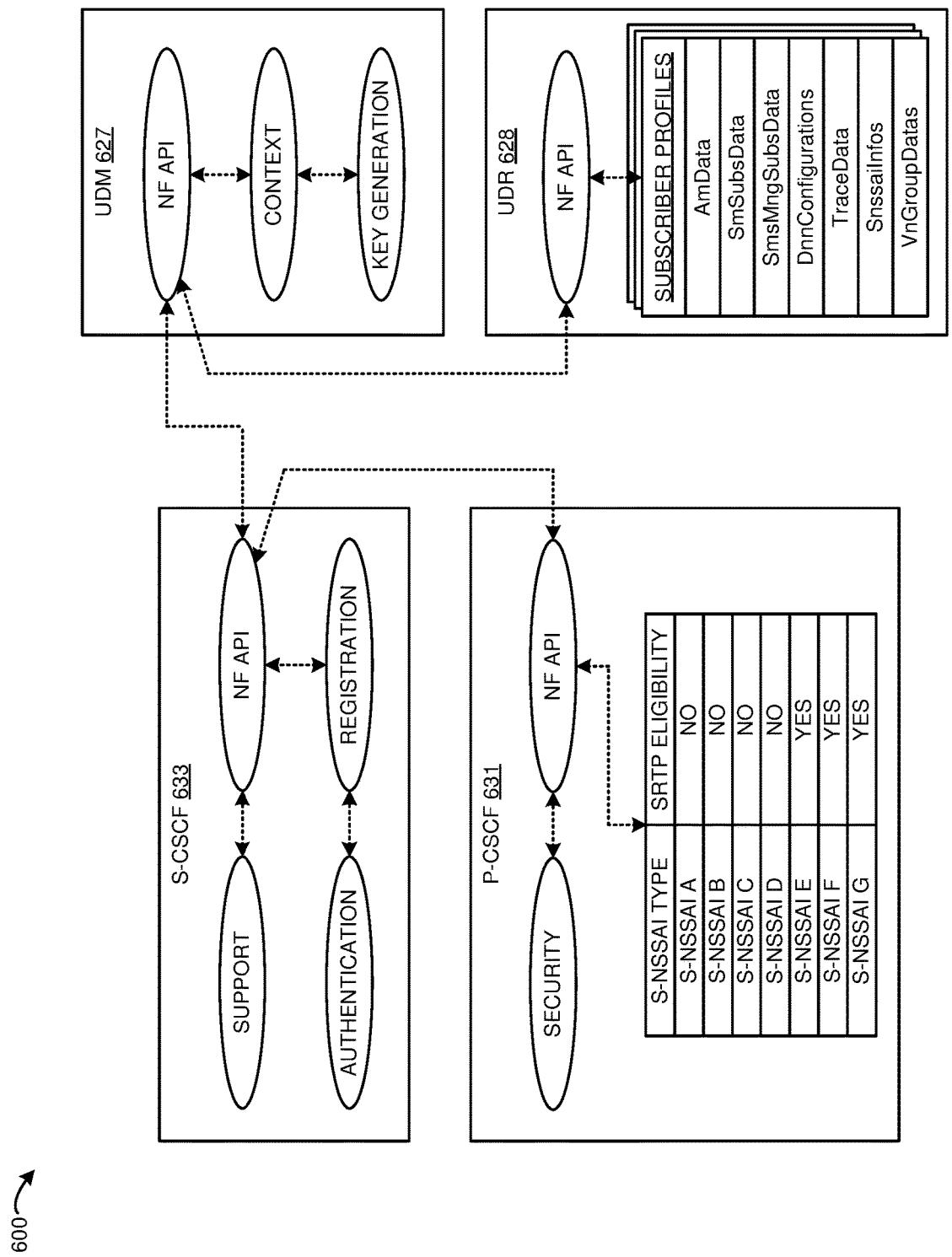
FIG. 7 illustrates network functions in the 5G wireless communication network.

FIG. 7 illustrates UDM 627, UDR 628, P-CSCF 631, and S-CSCF 633 in 5G wireless communication network 600. In some examples, UDM 627 comprises modules for network function (NF) Application Programming Interface (API), UE context, and key generation. The key generation module generates authentication data for S-CSCF 633 to use to authenticate UE 601. The context module retrieves subscribed service attributes for UE 601 from UDR 628 and provides the service attributes (e.g., S-NSSAI) to S-CSCF 633. UDR 628 comprises a network function API and stores subscriber profiles for network 600 subscribers, including UE 601. The subscriber profile comprises service attributes like access and mobility data (AmData), session management subscription data (SmSubsData), SMS management subscription data (SmsMngSubsData), DNN configurations (DnnConfigurations), Trace Data (TraceData), S-NSSAI information (SnssaiInfos), and virtual network group data (VnGroupDatas). P-CSCF 631 comprises modules for network function API and security and hosts a table that correlates S-NSSAI type to SRTP eligibility. The security module compares N-SSAIs to the table to select security protocols and establishes secure communication tunnels with UE 601 using security protocols like IPsec and SRTP. S-CSCF 633 comprises modules for UE registration, UE authentication, network function API, and multimedia session support. The registration module generates registration signaling to register UE 601 with IMS core 630. The authentication module generates authentication data for UE 601 like authentication challenges and confirms authentication responses received from UE. The support module supports monitors and supports multimedia sessions (e.g., voice calls) that UE 601 participates in. The network function APIs allow UDM 627, UDR 628, P-CSCF 631, and S-CSCF 633 to exchange signaling with each other and the other network functions in 5G core 620 and IMS core 630.

Figure 8:
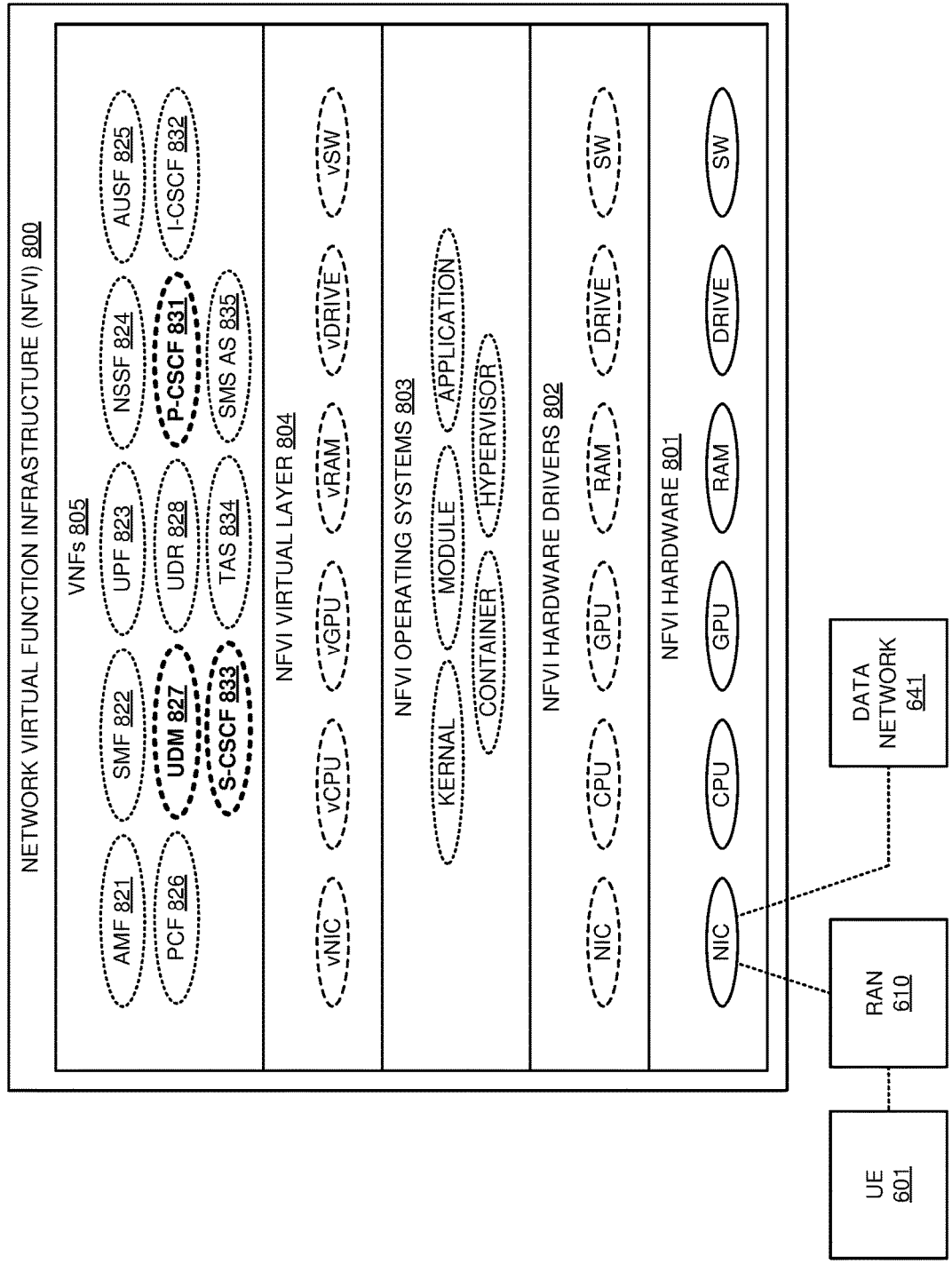
FIG. 8 illustrates a Network Function Virtualization Infrastructure (NFVI) in the 5G wireless communication network.

FIG. 8 illustrates Network Function Virtualization Infrastructure (NFVI) 800. NFVI 800 comprises an example of core network 121 and IMS 131 illustrated in FIG. 1 and network circuitry 320 and IMS circuitry 330 illustrated in FIG. 3, although core network 121, IMS 131, network circuitry 320, and IMS circuitry 330 may differ. NFVI 800 comprises NFVI hardware 801, NFVI hardware drivers 802, NFVI operating systems 803, NFVI virtual layer 804, and NFVI Virtual Network Functions (VNFs) 805. NFVI hardware 801 comprises Network Interface Cards (NICs), CPU, GPU, RAM, Flash/Disk Drives (DRIVE), and Data Switches (SW). NFVI hardware drivers 802 comprise software that is resident in the NIC, CPU, GPU, RAM, DRIVE, and SW. NFVI operating systems 803 comprise kernels, modules, applications, containers, hypervisors, and the like. NFVI virtual layer 804 comprises vNIC, vCPU, vGPU, vRAM, vDRIVE, and vSW. NFVI VNFs 805 comprise AMF 821, SMF 822, UPF 823, NSSF 824, AUSF 825, PCF 826, UDM 827, UDR 828, P-CSCF 831, S-CSCF 832, I-CSCF 833, TAS 834, and SMS AS 835. Additional VNFs and network elements like NEF, NRF, UDR, and HSS are typically present but are omitted for clarity. NFVI 800 may be located at a single site or be distributed across multiple geographic locations. For example, a first portion of NFVI 800 may be located at a first geographic location dedicated to the network functions in 5G network core 620 while a second portion of NFVI 800 may be located at a second geographic location dedicated to the IMS functions in IMS core 630. The NIC in NFVI hardware 801 is coupled to RAN 610 and data network 641. NFVI hardware 801 executes NFVI hardware drivers 802, NFVI operating systems 803, NFVI virtual layer 804, and NFVI VNFs 805 to form AMF 621, SMF 622, UPF 623, NSSF 624, AUSF 625, PCF 626, UDM 627, UDR 628, P-CSCF 631, I-CSCF 632, S-CSCF 633, TAS 634, and SMS AS 635.

Figure 9:
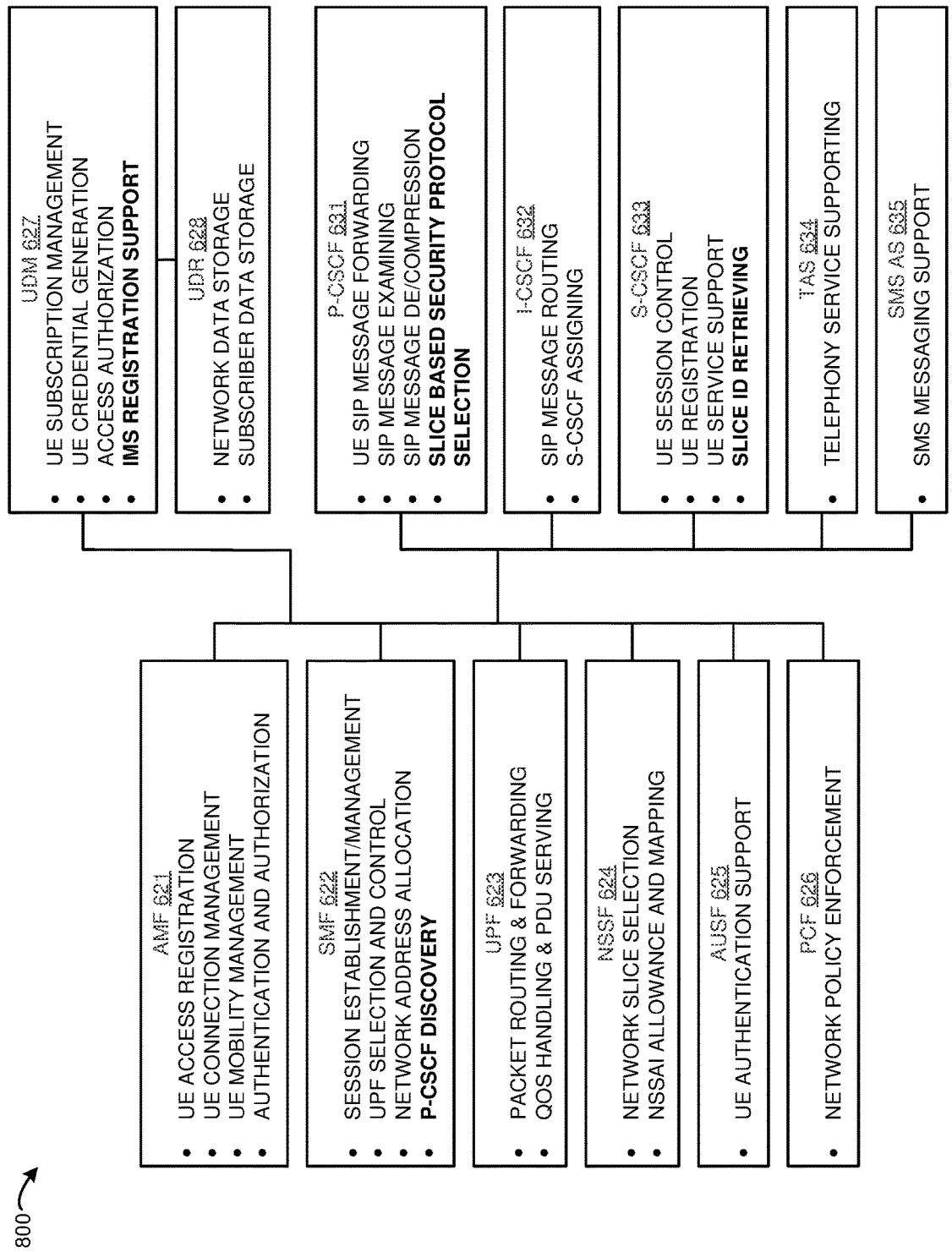
FIG. 9 further illustrates the NFVI in the 5G wireless communication network.

FIG. 9 further illustrates NFVI 800 in 5G communication network 600. AMF 621 comprises capabilities for UE access registration, UE connection management, UE mobility management, and authentication and authorization. SMF 622 comprises capabilities for session establishment and management, UPF selection and control, network address allocation, and P-CSCF discovery. UPF 623 comprises capabilities for packet routing and forwarding, QoS handling, and PDU serving. NSSF 624 comprises capabilities for network slice selection and NSSAI allowance and mapping. AUSF 625 comprises capabilities for UE authentication support. PCF 626 comprises capabilities for network policy enforcement. UDM 627 comprises capabilities for UE subscription management, UE credential generation, UE access authorization, and IMS registration support. UDR 628 comprises capabilities for network data storage and subscriber data storage. P-CSCF 631 comprises capabilities for UE SIP message forwarding, SIP message examining, SIP message compression, SIP message decompression, and slice-based security protocol selection. I-CSCF 632 comprises capabilities for SIP message routing and S-CSCF assigning. S-CSCF 633 comprises capabilities for UE session control, UE registration, UE service supporting, and slice ID retrieving. TAS 634 comprises capabilities for telephony service supporting. SMS AS 635 comprises capabilities for Short Message Service (SMS) messaging support.

In some examples, AMF 621 receives a registration request for UE 601 to register with network core 620 for wireless data services. The registration request comprises a registration type, UE capabilities, requested slice types, PDU session requests, and the like. AMF 621 transfers an identity request for delivery to UE 601. AMF 621 receives an identify indication for UE 601. AMF 621 interacts with AUSF 625, PCF 626, and UDM 627 to authenticate and authorize UE 601 for wireless data services. Responsive to the authentication and authorization, AMF 621 requests QoS metrics, allowed slice identifiers, service attributes, IMS permissions, and the like from UDM 627. UDM 627 accesses a subscriber profile for UE 601 to retrieve the requested information. UDM 627 transfers the requested subscriber information to AMF 621. AMF 621 interfaces with NSSF 624 to select a network slice for UE 601. NSSF 624 responds with an S-NSSAI for UE 601 based on the service attributes. AMF 621 selects SMF 622 to serve UE 601 based on the data retrieved from UDM 627 and the S-NSSAI returned by NSSF 624. In this example, UE 601 is subscribed to an MVNO hosted on network 600. The S-NSSAI returned by NSSF 624 comprises a network slice for UEs subscribed to that MVNO. Subscribers for the MVNO are not authorized to use SRTP.

SMF 622 selects P-CSCF 631 and UPF 623 based on the service information provided by UDM 627. SMF 622 indicates the network addresses for UPF 623 and P-CSCF 631 to AMF 621. AMF 621 generates UE context for UE 601 using the received information. The UE context comprises the QoS metrics, the S-NSSAI, the network addresses, the service attributes, and the like. AMF 621 transfers the UE context for delivery to UE 601. UPF 623 receives an IMS registration request generated by UE 601. UPF 623 reads the network address in the request and forwards the request to P-CSCF 631. P-CSCF 631 receives the registration request and performs a DNS query to retrieve a network address for I-CSCF 632. P-CSCF 631 forwards the registration request to I-CSCF 632. I-CSCF 632 generates and transfers a UAR to UDM 627. UDM 627 determines a set of available S-CSCFs and transfers a UAA indicating the S-CSCFs to I-CSCF 632. I-CSCF 632 selects S-CSCF 633 based on the UAA and forwards the registration request to S-CSCF 633.

S-CSCF 633 generates a MAR to retrieve user authentication data and the S-NSSAI for UE 601. S-CSCF 633 transfers the MAR to UDM 627. UDM 627 accesses a subscriber profile for UE 601 stored by UDR 628 to retrieve the S-NSSAI and the authentication data including a random number, an authentication token, a signed result, a cipher key, and an integrity key. UDM 627 transfers a MAA that includes the authentication data and N-SSAI to S-CSCF 633. S-CSCF 633 selects authentication vectors to verify the identity of UE 601 based on the authentication data. S-CSCF 633 generates a SIP 401 message that comprises the authentication data and transfers the SIP 401 message to I-CSCF 632 which in turn forwards the SIP 401 message to P-CSCF 631. S-CSCF 633 indicates the S-NSSAI for UE 601 to P-CSCF 631 over I-CSCF 632. P-CSCF 631 removes and caches a portion of the authentication data from the SIP 401 message. The cached portion of the authentication data comprises ciphering and integrity keys. The remaining authentication data comprises a random number and authentication token usable by UE 601 to generate an authentication response.

P-CSCF 631 compares the S-NSSAI for UE 601 to a table the indicates SRTP eligibility. Since the S-NSSAI for UE 601 is for an MVNO not authorized for SRTP, P-CSCF 631 determines UE 601 is ineligible for SRTP and responsively selects IPsec as the security protocol to use to complete the registration process. P-CSCF 631 inserts an IPsec indication into the message header of the SIP 401 message and transfers the SIP 401 message to UPF 623 for delivery to UE 601. UPF 623 transfers the SIP 401 message to UE 601 over RAN 610. P-CSCF 631 establishes IPsec tunnels for the client and server-side ports with UE 601 using the cached ciphering and integrity keys.

UPF 623 receives a second IMS registration request generated by UE 601 via the IPsec tunnels. The second registration request comprises an authentication response generated by UE. UPF 623 forwards the second registration request in the IPsec tunnels to P-CSCF 631 which in turn forwards the second registration request to I-CSCF 632. I-CSCF 632 reads the network address in the second registration request generates a second UAR for delivery to UDM 627. UDM 627 receives the UAR and transfers a UAA indicating the S-CSCFs to I-CSCF 632. I-CSCF 632 receives the UAA and selects S-CSCF 633. I-CSCF 632 forwards the second registration request with the authentication response to S-CSCF 633. S-CSCF 633 generates an SAR to retrieve subscriber data associated with UE 601 to verify the authentication response generated by UE 601. S-CSCF 633 transfers the SAR to UDM 627. UDM 627 accesses the subscriber profile for UE 601 stored by UDR 628 to retrieve the subscriber data. UDM 627 transfers an SAA that includes the subscriber data to S-CSCF 633. S-CSCF 633 compares an expected result for the authentication challenge to the authentication response from UE 601. S-CSCF 633 authenticates the identity of UE 601 when the expected result matches authentication response. S-CSCF 633 registers UE 601 for IMS service based on the authentication. S-CSCF 633 generates a SIP 200 message to acknowledge the registration. S-CSCF 633 transfers the SIP 200 message to I-CSCF 632 which in turn forwards the SIP 200 message to P-CSCF 631. P-CSCF 631 transfers the SIP 200 message to UPF 623. UPF 623 transfers the SIP 200 message for delivery to UE 601.

UPF 623 receives a SIP invite generated by UE 601 to initiate an MO IMS voice session. UPF 623 forwards the SIP invite message to P-CSCF 631. P-CSCF 631 interfaces with I-CSCF 632 and S-CSCF 633 to deliver the SIP invite to a message destination. S-CSCF 632 processes the SIP invite to select a message destination to establish the MO IMS session. S-CSCF 632 transfers the SIP invite to an application server in data network 641. The application server in data network 641 accepts the SIP invite and S-CSCF 633 indicates the acceptance to UE 601 over 5G core network 620. UPF 623 exchanges the user data for the MO IMS voice session with UE 601. UPF 623 exchanges the user data for the MO IMS voice session with the application server in data network 641. S-CSCF 633 interacts with TAS 634 to monitor the MO IMS voice session and control the data flow between UE 601 and data network 641.

Figure 10:
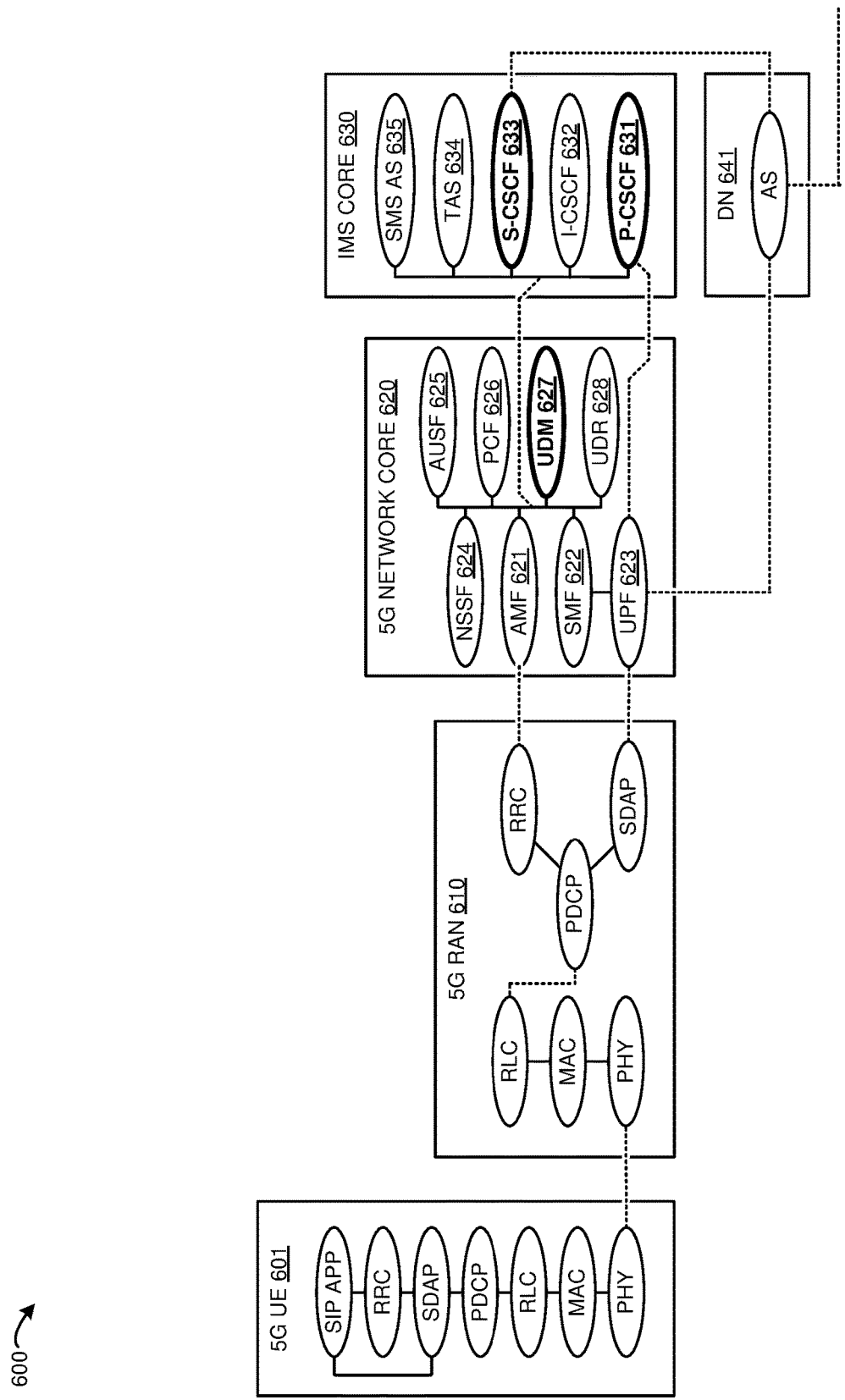
FIG. 10 illustrates an exemplary operation of the 5G wireless communication network to perform slice-based security protocol selection for IMS.

FIG. 10 illustrates an exemplary operation of 5G communication network 600 to perform slice-based security protocol selection for IMS. The operation may vary in other examples. As illustrated in FIG. 10, UE 601 and RAN 610 host 5G network applications for RRC, SDAP, PDCP, RLC, MAC, and PHY. UE 601 also hosts a SIP application (SIP APP). In some examples, UE 601 wirelessly attaches to RAN 610. The RRC in UE 601 exchanges attachment signaling with the RRC in RAN 610 over the PDCPs, RLCs, MACs, and PHYs. The RRC in RAN 610 transfers a registration request comprising a registration type, UE capabilities, requested slice types, and PDU session requests to AMF 621. AMF 621 transfers an identity request for UE 601 to the RRC in RAN 610. The RRC in RAN 610 forwards the identity request to the RRC in UE 601 over the PDCPs, RLCs, MACs, and PHYs. The RRC in UE 601 transfers an identity indication to the RRC in RAN 610 over the PDCPs, RLCs, MACs, and PHYs. The RRC in RAN 610 forwards the identity indication to AMF 621. AMF 621 interacts with AUSF 625, PCF 626, and UDM 627 to authenticate and authorize UE 601 for wireless data service.

Responsive to the authentication and authorization, AMF 621 retrieves QoS metrics, allowed S-NSSAI, service attributes, IMS permissions, and the like from UDM 627. UDM 627 pulls the requested data from a subscriber profile for UE 601 stored by UDR 628 and transfers the data to AMF 621. AMF 621 indicates the allowed S-NSSAI to NSSF 624 to select a network slice for UE 601. In this example, UE 601 resides in a geographic location that prohibits SRTP and NSSF 624 selects an S-NSSAI associated with the geographic location for UE 601. NSSF 624 indicates the S-NSSAI for UE 601 to AMF 621. AMF 621 selects SMF 622 to serve UE 601. SMF 622 selects P-CSCF 631 and UPF 623. SMF 622 indicates the network addresses for UPF 623 and P-CSCF 631 to AMF 621. AMF 621 generates UE context comprising the QoS metrics, the S-NSSAI, the network addresses, the service attributes, and the like. AMF 621 transfers the UE context to the RRC in RAN 610. The RRC in RAN 610 transfers the UE context to the RRC in UE 601 over the PDCPs, RLCs, MACs, and PHYs.

In response to a user input, the SIP application in UE 601 executes, and UE 601 initiates an IMS registration procedure to register with IMS core 630. The RRC in UE 601 drives the SIP application to generate a SIP registration message. The SDAP in UE 601 addresses the SIP registration message using the network address P-CSCF 631 in the UE context. The SDAP in UE 601 transfers the SIP registration message to the SDAP in RAN 610 over the PDCPs, RLCs, MACs, and PHYs. The SDAP in RAN 610 transfers the SIP registration message to UPF 623. UPF 623 transfers the SIP registration to P-CSCF 631 using the network address for P-CSCF 631. P-CSCF 631 receives the SIP registration request from UPF 623 and performs a DNS query to retrieve a network address for I-CSCF 632. P-CSCF 631 forwards the SIP registration request to I-CSCF 632 using the retrieved network address. I-CSCF 632 generates a UAR to identify available S-CSCFs and transfers the UAR for delivery to UDM 627. UDM 627 transfers a UAA indicating the S-CSCFs to I-CSCF 632. I-CSCF 632 receives the UAA and selects S-CSCF 633. I-CSCF 632 forwards the SIP registration request to S-CSCF 633.

S-CSCF 633 receives the SIP registration request and generates a MAR to retrieve user authentication data and S-NSSAI for UE 601. S-CSCF 633 transfers the MAR to UDM 627. UDM 627 accesses the subscriber profile for UE 601 stored by UDR 628 to retrieve the S-NSSAI, a random number, an authentication token, a signed result, a cipher key, and an integrity key to authenticate UE 601. UDM 627 transfers an MAA that includes the S-NSSAI, random number, authentication token, signed result, cipher key, and integrity key to S-CSCF 633. S-CSCF 633 selects authentication vectors to verify the identity of UE 601 based on the MAA and caches the signed result. S-CSCF 633 generates a SIP 401 message that comprises the random number, the authentication token, the cipher key, and the integrity key. S-CSCF 633 transfers the SIP 401 message and S-NSSAI for UE 601 to I-CSCF 632. I-CSCF 632 forwards the SIP 401 message and S-NSSAI to P-CSCF 631. P-CSCF 631 removes and caches the cipher key and the integrity key from the SIP 401 message. The remaining authentication data in the SIP 401 message comprises the random number and the authentication token. P-CSCF 631 compares the S-NSSAI to an SRTP eligibility table. Since the S-NSSAI is associated with a geographic location that prohibits (e.g., by law), P-CSCF 631 determines the S-NSSAI for UE 601 is ineligible for SRTP. In response, P-CSCF 631 selects IPsec as the security protocol and inserts an IPsec indication into a message header of the SIP 401 message.

P-CSCF 631 transfers the SIP 401 message to UPF 623. UPF 623 transfers the SIP 401 message to the SDAP in RAN 610. The SDAP in RAN 610 transfers the SIP 401 message to the SDAP in UE 601 over the PDCPs, RLCs, MACs, and PHYs. The SDAP in UE 601 indicates the SIP 401 message to the RRC in UE 601. The RRC in UE 601 verifies the authentication token for IMS core 630 and uses the random number received in the SIP 401 message to generate an authentication response. The RRC in UE 601 and P-CSCF 631 establish IPsec security associations for all client side and server-side ports using the ciphering and integrity keys.

In response to the SIP 401 message, the RRC in UE 601 drives the SIP application to generate a second SIP registration request. The SDAP includes the authentication response in the second SIP registration message and transfers the second SIP registration message to the SDAP in RAN 610 over the PDCPs, RLCs, MACs, and PHYs. The SDAP in RAN 610 transfers the second SIP registration request to UPF 623. UPF 623 transfers the second SIP registration request to P-CSCF 631.

P-CSCF 631 receives the second SIP registration request from UPF 623. P-CSCF 631 and forwards the second registration request to I-CSCF 632. I-CSCF 632 generates a second UAR and transfers the UAR to UDM 627. UDM 627 receives the UAR and transfers a UAA indicating the S-CSCFs to I-CSCF 632. I-CSCF 632 receives the UAA and selects S-CSCF 633. I-CSCF 632 forwards the second SIP registration request with the authentication response generated by UE 601 to S-CSCF 633. S-CSCF 633 generates an SAR and transfers the SAR for delivery to UDM 627. UDM 627 receives the SAR and accesses the subscriber profile for UE 601 stored on UDR 628 to retrieve the subscriber data. UDM 627 transfers an SAA that includes the subscriber data to S-CSCF 633. S-CSCF 633 matches an expected result for the authentication challenge to the authentication response generated by UE 601 to authenticate the identity of UE 601. S-CSCF 633 registers UE 601 for IMS service based on the authentication. S-CSCF 633 generates a SIP 200 message to acknowledge the registration. S-CSCF 633 transfers the SIP 200 message to I-CSCF 632. I-CSCF 632 forwards the SIP 200 message to P-CSCF 631. P-CSCF 631 transfers the SIP 200 message to UPF 623. UPF 623 transfers the SIP 200 message to the SDAP in RAN 610. The SDAP in RAN 610 transfers the SIP 200 message to the SDAP in UE 601 over the PDCPs, RLCs, MACs, and PHYs.

Once registered, UE 601 initiates a MO IMS video session in response to user input. The RRC in UE 601 controls the SIP application to generate a SIP invite message and addresses the message for delivery to P-CSCF 631. The SDAP in UE 601 transfers the SIP invite to the SDAP in RAN 610 over PDCPs, RLCs, MACs, and PHYs. The SDAP in RAN 610 transfers the SIP invite to UPF 623. UPF 623 forwards the SIP invite message to P-CSCF 631. P-CSCF 631 receives the SIP invite and in response, interfaces with I-CSCF 632 and S-CSCF 633 to deliver the SIP invite. S-CSCF 633 interacts with I-CSCF 632 and/or other IMS functions to select a message destination for the MO IMS session based on the SIP invite. S-CSCF 633 transfers the SIP invite to the application server (AS) in data network 641. The application server accepts the SIP invite. S-CSCF 633 indicates the acceptance to UPF 623. UPF 623 transfers the indication to the SDAP in RAN 610. The SDAP in RAN 610 transfers the acceptance to the SDAP in UE 601 over the PDCPs, RLCs, MACs, and PHYs. The SDAP in UE 601 exchanges user data for the MO IMS video session with the SDAP in RAN 610. The SDAP in RAN 610 exchanges the user data for the MO IMS video session with UPF 623. UPF 623 exchanges the user data for the MO IMS video session with the application server in data network 641.

The wireless data network circuitry described above comprises computer hardware and software that form special-purpose network circuitry to perform slice-based security protocol selection for IMS. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to perform slice-based security protocol selection for IMS.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to perform slice-based security protocol selection for Internet Protocol Multimedia Subsystem (IMS), the method comprising:
   receiving an IMS registration request transferred by a wireless user device, generating an authorization request that includes an Address Value Pair (AVP) requesting a slice Identifier (ID) for the wireless user device, and transferring the authorization request to a network data system;
   receiving an authorization response from the network data system that includes the slice ID for the wireless user device;
   selecting a security protocol for authenticating the wireless user device based on the slice ID; and
   transferring an authentication challenge for delivery to the wireless user device and establishing a secure communication channel with the wireless user device using the selected security protocol.

2. The method of claim 1 further comprising:
   hosting a table that correlates security protocols to slice IDs; and wherein:
   selecting the security protocol based on the slice ID comprises comparing the slice ID for the wireless user device to the table and selecting the security protocol for authenticating the wireless user device based on the comparison.

3. The method of claim 1 wherein:
selecting the security protocol based on the slice ID comprises selecting one of Internet Protocol Security (IPsec) or Secure Real-Time Transport Protocol (SRTP) for authenticating the wireless user device based on the slice ID; and
establishing the secure communication channel using the selected security protocol comprises establishing the secure communication channel using the selected one of IPsec or SRTP.

4. The method of claim 3 wherein the slice ID comprises a Single Network Slice Selection Assistance Information (S-NSSAI); and further comprising:
comparing the S-NSSAI for the wireless user device to a table that correlates SRTP eligibility to S-NSSAIs to determine when the wireless user device is eligible for SRTP;
when the wireless user device is eligible for SRTP, selecting SRTP for authenticating the wireless user device and establishing the secure communication channel using SRTP; and
when the wireless user device is ineligible for SRTP, selecting IPsec for authenticating the wireless user device and establishing the secure communication channel using IPsec.

5. The method of claim 1 wherein:
the slice ID for the wireless user device indicates a geographic location for the wireless user device; and
selecting the security protocol based on the slice ID comprises selecting the security protocol for authenticating the wireless user device based on the slice ID and the geographic location.

6. The method of claim 1 wherein:
the slice ID for the wireless user device indicates a Mobile Virtual Network Operator (MVNO) for the wireless user device; and
selecting the security protocol based on the slice ID comprises selecting the security protocol for authenticating the wireless user device based on the slice ID and the MVNO.

7. The method of claim 1 wherein:
the authentication challenge comprises a Session Initiation Protocol (SIP) 401 message; and
transferring the authentication challenge for delivery to the wireless user device comprises including the selected security protocol in a message header of the SIP 401 message and transferring the SIP 401 message for delivery to the wireless user device.

8. The method of claim 1 wherein:
transferring the authorization request to the network data system comprises transferring a Multimedia Authorization Request (MAR) to a Unified Data Management (UDM); and
receiving the authorization response from the network data system that includes the slice ID for the wireless user device comprises receiving a Multimedia Authorization Answer (MAA) from the UDM that includes the slice ID for the wireless user device.

9. The method of claim 1 wherein:
transferring the authorization request to the network data system comprises transferring a Multimedia Authorization Request (MAR) to a Home Subscriber Server (HSS); and receiving the authorization response from the network data system that includes the slice ID for the wireless user device comprises receiving a Multimedia Authorization Answer (MAA) from the HSS that includes the slice ID for the wireless user device.

10. A wireless communication network to perform slice-based security protocol selection for Internet Protocol Multimedia Subsystem (IMS), the wireless communication network comprising:
Call Session Control Function (CSCF) circuitry configured to:
receive an IMS registration request transferred by a wireless user device, generate an authorization request that includes an Address Value Pair (AVP) requesting a slice Identifier (ID) for the wireless user device, and transfer the authorization request to a network data system;
receive an authorization response from the network data system that includes the slice ID for the wireless user device;
select a security protocol for authenticating the wireless user device based on the slice ID; and
transfer an authentication challenge for delivery to the wireless user device and establish a secure communication channel with the wireless user device using the selected security protocol.

11. The wireless communication network of claim 10 wherein the CSCF circuitry is further configured to:
host a table that correlates security protocols to slice IDs; and
compare the slice ID for the wireless user device to the table and select the security protocol for authenticating the wireless user device based on the comparison.

12. The wireless communication network of claim 10 wherein the CSCF circuitry is configured to:
select one of Internet Protocol Security (IPsec) or Secure Real-Time Transport Protocol (SRTP) for authenticating the wireless user device based on the slice ID to select the security protocol based on the slice ID; and
establish the secure communication channel using the selected one of IPsec or SRTP to establish the secure communication channel using the selected security protocol.

13. The wireless communication network of claim 12 wherein the slice ID comprises a Single Network Slice Selection Assistance Information (S-NSSAI); and the CSCF circuitry is further configured to:
compare the S-NSSAI for the wireless user device to a table that correlates SRTP eligibility to S-NSSAIs to determine when the wireless user device is eligible for SRTP;
when the wireless user device is eligible for SRTP, select SRTP for authenticating the wireless user device and establish the secure communication channel using SRTP; and
when the wireless user device is ineligible for SRTP, select IPsec for authenticating the wireless user device and establish the secure communication channel using IPsec.

14. The wireless communication network of claim 10 wherein:
the slice ID for the wireless user device indicates a geographic location for the wireless user device; and
the CSCF circuitry is configured to:

select the security protocol for authenticating the wireless user device based on the slice ID and the geographic location to select the security protocol based on the slice ID.

15. The wireless communication network of claim 10 wherein:
the slice ID for the wireless user device indicates a Mobile Virtual Network Operator (MVNO) for the wireless user device; and the CSCF circuitry is configured to:
select the security protocol for authenticating the wireless user device based on the slice ID and the MVNO to select the security protocol based on the slice ID.

16. The wireless communication network of claim 10 wherein:
the authentication challenge comprises a Session Initiation Protocol (SIP) 401 message; and the CSCF circuitry is configured to:
include the selected security protocol in a message header of the SIP 401 message and transfer the SIP 401 message for delivery to the wireless user device to transfer the authentication challenge for delivery to the wireless user device.

17. The wireless communication network of claim 10 wherein the CSCF circuitry is configured to:
transfer a Multimedia Authorization Request (MAR) to a Unified Data Management (UDM) to transfer the authorization request to the network data system; and
receive a Multimedia Authorization Answer (MAA) from the UDM that includes the slice ID for the wireless user device to receive the authorization response from the network data system that includes the slice ID for the wireless user device.

18. The wireless communication network of claim 10 wherein:
transfer a Multimedia Authorization Request (MAR) to a Home Subscriber Server (HSS) to transfer the authorization request to the network data system; and
receive a Multimedia Authorization Answer (MAA) from the HSS that includes the slice ID for the wireless user device to receive the authorization response from the network data system that includes the slice ID for the wireless user device.

19. One or more non-transitory computer readable storage media having program instructions stored thereon to perform slice-based security protocol selection for Internet Protocol Multimedia Subsystem (IMS), wherein the program instructions, when executed by a computing system, direct the computing system to perform operations, the operations comprising:
receiving an IMS registration request transferred by a wireless user device, generating a Multimedia Authorization Request (MAR) that includes an Address Value Pair (AVP) requesting a Single Network Slice Selection Assistance Information (S-NSSAI) for the wireless user device, and transferring the MAR to a network data system;
receiving a Multimedia Authorization Answer (MAA) from the network data system that includes the S-NSSAI for the wireless user device;
selecting one of Internet Protocol Security (IPsec) or Secure Real-Time Transport Protocol (SRTP) for authenticating the wireless user device based on the S-NSSAI; and
transferring a Session Initiation Protocol (SIP) 401 message for delivery to the wireless user device that indicates the selected one of IPsec or SRTP and establishing a secure communication channel with the wireless user device using the selected one of IPsec or SRTP.

20. The one or more non-transitory computer readable storage media of claim 19 wherein
the operations further comprise:
comparing the S-NSSAI for the wireless user device to a table that correlates SRTP eligibility to S-NSSAIs to determine when the wireless user device is eligible for SRTP;
when the wireless user device is eligible for SRTP, selecting SRTP for authenticating the wireless user device, including an SRTP indication in a message header of the SIP 401 message, transferring the SIP 401 message for delivery to the wireless user device, and establishing the secure communication channel using SRTP; and
when the wireless user device is ineligible for SRTP, selecting IPsec for authenticating the wireless user device, including an IPsec indication in the message header of the SIP 401 message, transferring the SIP 401 message for delivery to the wireless user device, and establishing the secure communication channel using IPsec.

* * * * *